US008589980B2

(12) United States Patent
Tapiola et al.

(10) Patent No.: US 8,589,980 B2
(45) Date of Patent: Nov. 19, 2013

(54) APPARATUS AND A METHOD FOR CONTENT RETRIEVAL FOR PRESENTATION IN A TELEVISION BROWSER ENVIRONMENT

(75) Inventors: Antti Tapiola, Kisko (FI); Jussi Hakunti, Turku (FI)

(73) Assignee: Uniqoteq Oy, Turku (FI)

( * ) Notice: Subject to any disclaimer, the term of this patent is extended or adjusted under 35 U.S.C. 154(b) by 0 days.

(21) Appl. No.: 13/564,826

(22) Filed: Aug. 2, 2012

(65) Prior Publication Data
US 2013/0036441 A1 Feb. 7, 2013

(30) Foreign Application Priority Data
Aug. 2, 2011 (FI) ...................................... 20115779

(51) Int. Cl.
*G06F 3/00* (2006.01)
(52) U.S. Cl.
USPC ............... 725/51; 725/52; 725/133; 725/141; 725/153
(58) Field of Classification Search
USPC ............. 725/39–61, 132, 133, 140, 141, 152, 725/153
See application file for complete search history.

(56) References Cited

U.S. PATENT DOCUMENTS

| 7,913,280 B1 | 3/2011 | Roberts |
| 7,917,602 B2 | 3/2011 | Sweatt, III et al. |
| 2005/0097622 A1* | 5/2005 | Zigmond et al. ............... 725/135 |
| 2005/0235331 A1 | 10/2005 | Lynch |
| 2007/0097929 A1 | 5/2007 | Dunko et al. |
| 2008/0171600 A1 | 7/2008 | Ostergren et al. |
| 2008/0229352 A1* | 9/2008 | Pino et al. ........................ 725/22 |
| 2008/0242221 A1 | 10/2008 | Shapiro et al. |
| 2009/0144795 A1 | 6/2009 | Yu et al. |
| 2009/0183215 A1* | 7/2009 | McCartie et al. ............. 725/105 |
| 2009/0307721 A1* | 12/2009 | Aframet al. .................... 725/34 |
| 2011/0070820 A1 | 3/2011 | Gao et al. |

FOREIGN PATENT DOCUMENTS

| WO | 03088654 A2 | 10/2003 |
| WO | 2007050177 A1 | 5/2007 |

* cited by examiner

*Primary Examiner* — Farzana Hossain
(74) *Attorney, Agent, or Firm* — Lowe Hauptman & Ham LLP

(57) ABSTRACT

The invention concerns a method and an apparatus performing the method. In the method a change to a background download enabled state is detected at a mobile node. The mobile node retrieves at least one content package from a remote node and detects a change to a browsing mode. The mobile node indicates the existence of at least one content package on a display to the user and receiving an indication via a remote control unit of a selection of a content package by the user. In response, the mobile node presents content from at least one file in the content package on the display, receives an indication via the remote control unit of a selection of a hyperlink in the content package and downloads a content item corresponding to the hyperlink.

15 Claims, 4 Drawing Sheets

US 8,589,980 B2

APPARATUS AND A METHOD FOR CONTENT RETRIEVAL FOR PRESENTATION IN A TELEVISION BROWSER ENVIRONMENT

RELATED APPLICATIONS

The present application is based on, and claims priority from, Finish Application Number 20115779, filed Aug. 2, 2011, the disclosure of which is hereby incorporated by reference herein in its entirety.

BACKGROUND OF THE INVENTION

1. Field of the Invention

The invention relates to mobile communications networks and an apparatus and a method for content retrieval for presentation in a television browser environment.

2. Description of the Related Art

The introduction of enhanced bitrates available in 3G and 4G networks have made it meaningful to use television as a browser display for mobile terminals. Content may be retrieved over a radio connection provided by a 3G or a 4G cellular radio access network for presentation on a television display connected to a mobile terminal such as a mobile phone. Examples of the 3G and 4G radio access network technologies are the Universal Mobile Communication System (UMTS) and the Long-Term Evolution (LTE) standardized by the 3G Partnership Project (3GPP). A UMTS radio access network provides bitrates up to 14 Mbit/s with the HSDPA feature and up to 42.2 Mbit/s in a dual-cell and up to 84.4 Mbit/s in a dual-cell with Multiple Input-Multiple Output (MIMO) antennas. The dual-cell is supported by the 3GPP release 8 and MIMO by 3GPP release 7. One of the main objectives of the LTE is the providing of downlink data rates of at least 100 Mbps and uplink date rates of at least 50 Mbps. As of 11 May 2011 over two thirds of the 398 commercial Highspeed Packet Access (HSPA) operators support peak downlink bitrate of at least 7.2 Mbit/s. However, in most cases the average bitrates supported continuously for most of the users fall far below the maximum bitrates made available by the standards.

A problem with the present Internet portals and services is that they have not been tailored for use in mobile terminal based browsers. In many cases the Internet portals present graphics, video and animation intensive main pages. Even if the main pages would download tolerably fast, the navigation to more specific services or to more specific content categories requires further downloading and further delays. For each of the more specific content categories there may be further portals with graphics, video and animation intensive main pages. Even if the download speed would be sufficient as such to provide tolerable delays, there may appear delays in the service provider side in the answering of the Hypertext Transfer Protocol (HTTP) requests from clients. In some cases where a television is used as a display for a mobile terminal browser, the users might appreciate the possibility of changing quickly from the viewing of television programs to the viewing of Internet content on the television screen and back to the viewing of television programs. The changing might occur, for example, during commercials in between the television programs.

It would be beneficial to be able to obtain content for quick viewing in particular in mobile terminal based browsers that use a television display to present the content.

SUMMARY OF THE INVENTION

According to an aspect of the invention, the invention is a method, comprising: detecting a change to a background download enabled state at a mobile node; retrieving at least one content package from a remote node; detecting a change to a browsing mode in the mobile node; indicating the existence of at least one content package on a display to the user; receiving an indication via a remote control unit of a selection of a content package by the user; presenting content from at least one file in the content package on the display; receiving at the mobile node an indication via the remote control unit of a selection of a hyperlink in the content package; and downloading a content item corresponding to the hyperlink at the mobile node.

According to a further aspect of the invention, the invention is an apparatus comprising: at least one processor configured to detect a change to a background download enabled state at the apparatus, to retrieve at least one content package from a remote node, to detect a change to a browsing mode in the apparatus, to indicate the existence of at least one content package on a display to the user, to receive an indication via a remote control unit of a selection of a content package by the user, to present content from at least one file in the content package on the display, to receive at the mobile node an indication via the remote control unit of a selection of a hyperlink in the content package and to download a content item corresponding to the hyperlink at the mobile node.

According to a further aspect of the invention, the invention is a television browser node comprising the apparatus.

According to a further aspect of the invention, the invention is an apparatus comprising: means for detecting a change to a background download enabled state at a mobile node; means for retrieving at least one content package from a remote node; means for detecting a change to a browsing mode in the mobile node; means for indicating the existence of at least one content package on a display to the user; means for receiving an indication via a remote control unit of a selection of a content package by the user; means for presenting content from at least one file in the content package on the display; means for receiving at the mobile node an indication via the remote control unit of a selection of a hyperlink in the content package; and means for downloading a content item corresponding to the hyperlink at the mobile node.

According to a further aspect of the invention, the invention is a computer program comprising code adapted to cause the following when executed on a data-processing system: detecting a change to a background download enabled state at a mobile node; retrieving at least one content package from a remote node; detecting a change to a browsing mode in the mobile node; indicating the existence of at least one content package on a display to the user; receiving an indication via a remote control unit of a selection of a content package by the user; presenting content from at least one file in the content package on the display; receiving at the mobile node an indication via the remote control unit of a selection of a hyperlink in the content package; and downloading a content item corresponding to the hyperlink at the mobile node.

According to a further aspect of the invention, the invention is a computer program product comprising the computer program.

In one embodiment of the invention, the mobile node is configured to be connected to a television. The mobile node may comprise a connector or an interface for a cable or a wireless connection to the television.

In one embodiment of the invention, the mobile node is a unit in association with a television. The unit may be removable.

In one embodiment of the invention, the at least one processor of the apparatus is further configured to receive from a remote control unit or from a television comprising the display an indication of a change to television screen or display closed mode and to transition to the download enabled state at the mobile node.

In one embodiment of the invention, the at least one processor of the apparatus is further configured to receive from a remote control unit an indication of a change to television program viewing mode and to transition to the download enabled state at the apparatus in response to the change to television program viewing mode. The change to television program viewing mode may be from a content browsing mode. The change may be indicated using a remote control unit button. The apparatus may be in the browsing mode or in the television program viewing mode. The apparatus may also be in a television screen or display closed mode. The apparatus may enter the download enabled state in response to entering the television screen or display closed mode.

In one embodiment of the invention, the at least one processor of the apparatus is further configured to detect the elapsing of a predefined time from receiving the indication of the change to a television program viewing mode. The predefined time may be, for example, one minute. The predefined time may be determined to represent a time that with a probability that exceeds a predefined threshold, for example, 0.9, for the current users continued viewing of television program for at least a predefined number of next minutes, for example next 15 minutes, without transitioning back to content browsing mode.

In one embodiment of the invention, the at least one processor of the apparatus is further configured to receive from a network providing the cellular wireless connection an indication of at least one suitable time for performing downloading. From the network may also be received a schedule of suitable times for the downloading. The suitable times may represent anticipated low load in the cellular network providing the wireless cellular radio connection.

In one embodiment of the invention, the at least one processor of the apparatus is further configured to receive from a remote control unit a selection of a user profile and to indicate from the mobile node to the remote node an identifier of the current user of the mobile node.

In one embodiment of the invention, the at least one processor of the apparatus is further configured to receive at least one user profile attribute at the mobile node and to associate the at least one user profile attribute with a user identifier and to transmit the at least one user profile attribute and the user identifier to the remote node.

In one embodiment of the invention, the at least one processor of the apparatus is further configured to determine a location of the mobile node based on information provided from a network providing the wireless cellular connected and to set the location of the mobile node as a user profile attribute. The location may be, for example, a location area, a tracking area, a routing area, a cell or a geographic area.

In one embodiment of the invention, the at least one processor of the apparatus is further configured to open a label file from a content package stored in the mobile node and to present a content package selection menu for the user, the content package selection menu comprising a label for the content package, the label being used to present the content from the label file.

In one embodiment of the invention, a content package comprises at least one hypertext file and at least one media file referred to in the hypertext file. The media file may be, for example, a picture file, a video file or an audio file. The hypertext file may also comprise links referring to objects not comprised in the hypertext file.

In one embodiment of the invention, a content package comprises at least one presentation file and at least one media file referred to in the presentation file. The media file may be, for example, a picture file, a video file or an audio file. The presentation file may also define user-selectable links referring to objects not comprised in the hypertext file. The presentation file may determine a timing for presenting the at least one media file in the content package.

In one embodiment of the invention, the at least one processor of the apparatus is further configured to transition to a background download disabled state in response to detecting the change to the browsing mode.

In one embodiment of the invention, at least one content category attribute in each content package received during the background download enabled state match at least one user profile attribute of a current user.

In one embodiment of the invention, the mobile node comprises a Long-Term Evolution (LTE) User Equipment or a Universal Mobile Telecommunications System (UMTS) User Equipment.

In one embodiment of the invention, the display is comprised in an external television. The display may be the screen of the external television. The mobile node may be configured to control the display via an interface in the mobile node.

In one embodiment of the invention, the at least one content package is retrieved from the remote node over a cellular wireless connection. The content package may also be retrieved over a wireless local area network connection or a wired connection, for example, a fixed internet connection.

In one embodiment of the invention, the remote node is a remote mobile node, for example an LTE User Equipment (UE). The remote node may also be a desktop, a desk computer or a server. The remote node may also be a fixed network node.

In one embodiment of the invention, the mobile node, for example, a User Equipment (UE) comprises a mobile station or generally a mobile terminal. In one embodiment of the invention a user of a mobile terminal is identified using a subscriber module, for example, User Services Identity Module (USIM) or a Subscriber Identity Module (SIM). The combination of Mobile Equipment (ME) and a subscriber module may be referred to as a mobile subscriber. A mobile subscriber may be identified using an IMSI. An IP address may be allocated or associated with a mobile subscriber embodiment of the invention, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, the computer program product is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, an apparatus, a computer program or a computer program product to which the invention is related may comprise at least one of the embodiments of the invention described hereinbefore.

It is to be understood that any of the above embodiments or modifications can be applied singly or in combination to the respective aspects to which they refer, unless they are explicitly stated as excluding alternatives.

The benefits of the invention are related to improved response times in presenting Internet related content to users that access the Internet over a wireless cellular connection.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
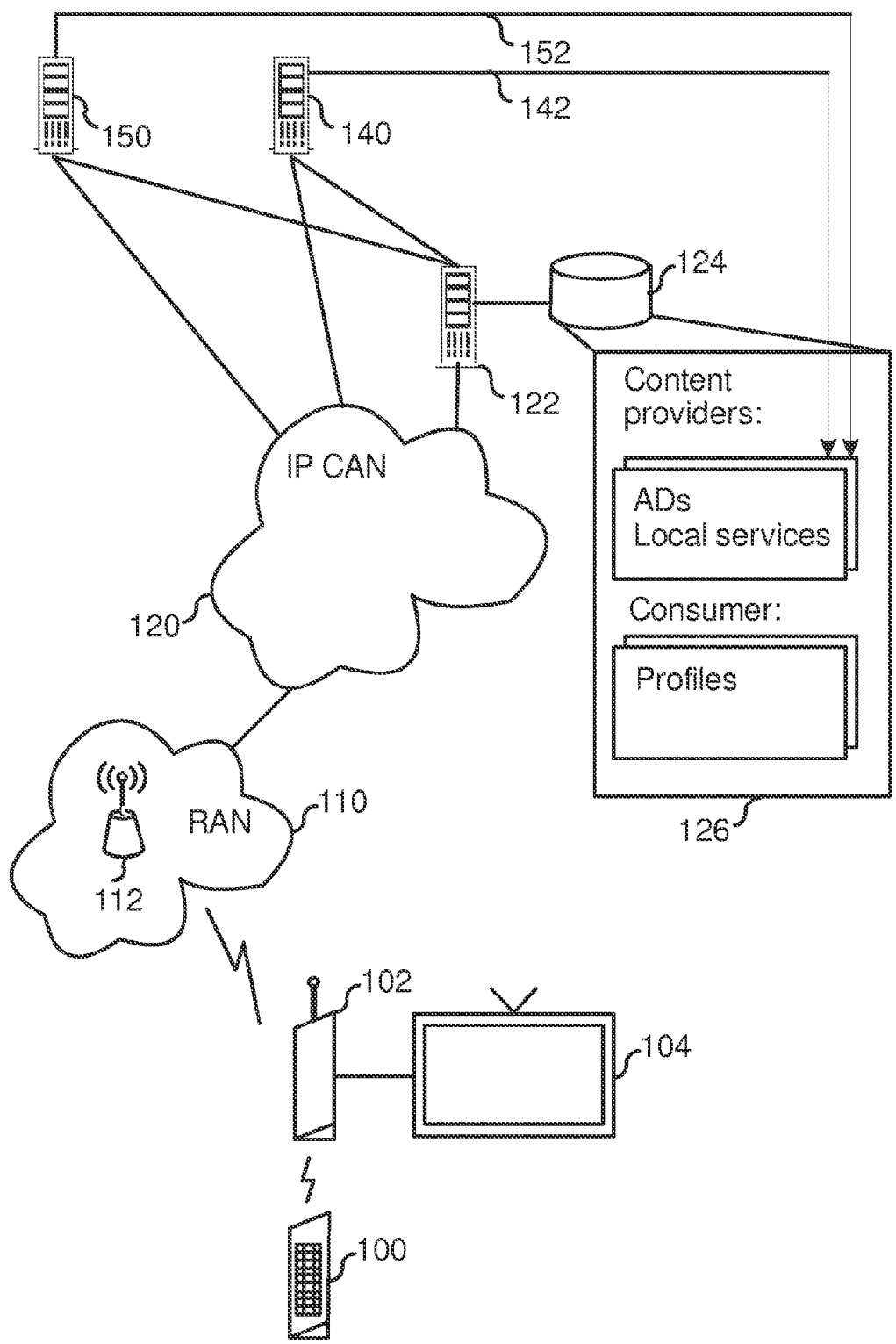
FIG. 1 illustrates a television browser system communicating with a mobile communication system in one embodiment of the invention.

FIG. 1 illustrates a television browser system communicating with a mobile communication system in one embodiment of the invention.

In FIG. 1 there is illustrated a television browser node 102, which is connected to a television 104. Browser node 102 is controlled using a remote control unit 100. Browser node 102 may be also referred to as a mobile node. Remote control unit 100 may comprise a keypad for controlling television 104 directly and it may comprise a keypad for controlling browser node 102, which may be a separate keypad. The separate keypad may be placed underneath remote control unit 100. The communication between browser node 102 and remote control unit 100 occurs, for example, over Infrared (IR) or over a Radio Frequency (RF). Browser node 102 is configured to communicate with a base station 112 in a Radio Access Network (RAN) 110. Base station 112 is, for example, a UMTS Node B. RAN 110 is communicatively connected to an IP Connectivity Access Network (IP CAN) 120, which provide an IP address for browser node 102 and provide connectivity to a content adaptation server 122, a service provider node 140 and a service provider node 150. Content adaptation server 122 comprises a database 124, which comprises information on content providers and content consumers. For content consumers there are stored user profiles which comprise at least one user profile attribute. The at least one user profile attribute may comprise at least one interest category for a user. The at least one user profile attribute may also comprise at least one demographic attribute of the user such as, for example, gender, race, age, disabilities, mobility, home ownership, employment status and location. For content providers there are stored, for example, advertisements and local services. The advertisements and local services may be stored in the form of a number of content packages. A content package comprises at least one content file. A content file may, for example, be a hypertext page, a Synchronized Multimedia Integration Language (SMIL) presentation, a video file, an audio file and an image file. The content package may be compressed to yield a compressed package file comprising at least one file. A content package may comprise at least one file which has a hyperlink to content not defined in the content package that requires the fetching of at least one content file referred to by the hyperlink. A content package may also comprise a specifically designated icon file, which is played whenever the existence of a content package is indicated to the user of the browsing node 102 via a user interface for the browsing of content packages in the browsing node. The icon file may, for example, be an image, a video or an animated image. The icon file may be specifically named in the content package to indicate that it must be used to load an icon for presentation on the user interface of browsing node 102.

At least one content package stored in database 124 may be formed using information stored in service provider nodes 140 and 150, as illustrated with arrows 142 and 152, respectively. The content packages may be formed so that content adaptation server 122 obtains content files from service provider node 140 and 150 using, for example, the HTTP protocol. The content files may be offered, for example, via specific Uniform Resource Locators (URLs) offered for network operators. Content adaptation server 122 may use the content files to create at least one content package for downloading to television browser node 102.

In one embodiment of the invention, the content packages stored in content adaption server 122 are associated with at least one content category attribute. A content category attribute may describe an interest category of a content package, for example, whether the content package represents politics, economics, entertainment, sports or science. At least one content category attribute may also represent demographics of a targeted audience group for the content package such as, for example, gender, race, age, disabilities, mobility, home ownership, employment status and location. Upon starting to download content packages, the television browser node may identify the current user of the television browser node to content adaptation server 122, which may provides in response only content packages that have content category attributes matching the user profile attributes of the current user.

In one embodiment of the invention, the content packages stored in television browser node 102 are presented to a user in several phases. In the first page content packages available are indicated to the user. The indication may comprise the presentation of an icon, a thumbnail or a label that gives an indication of the type of content in a content package. Thereupon, the user selects a content package based on the indication, using a pointer tool of remote controller unit 100 and the selection is indicated to television browser node 102. Thereupon, the content package content is presented, for example, on a window to the user. Thereupon, the user may select a hyperlink embedded in the content package, using remote controller unit 100, for example, on a page, an image or a video for the selection of a content item that needs to be downloaded upon the selection of the hyperlink by the user, this may be interpreted so that the content item is not downloaded to the television browser node 102 beforehand.

It should be noted that the number of network elements and mobile nodes in FIG. 1 is just for illustrative purposes. There may be any number of network elements illustrated in FIG. 1.

The embodiments of the invention described hereinbefore in association with FIG. 1 may be used in any combination with each other. Several of the embodiments may be combined together to form a further embodiment of the invention.

Figure 2:
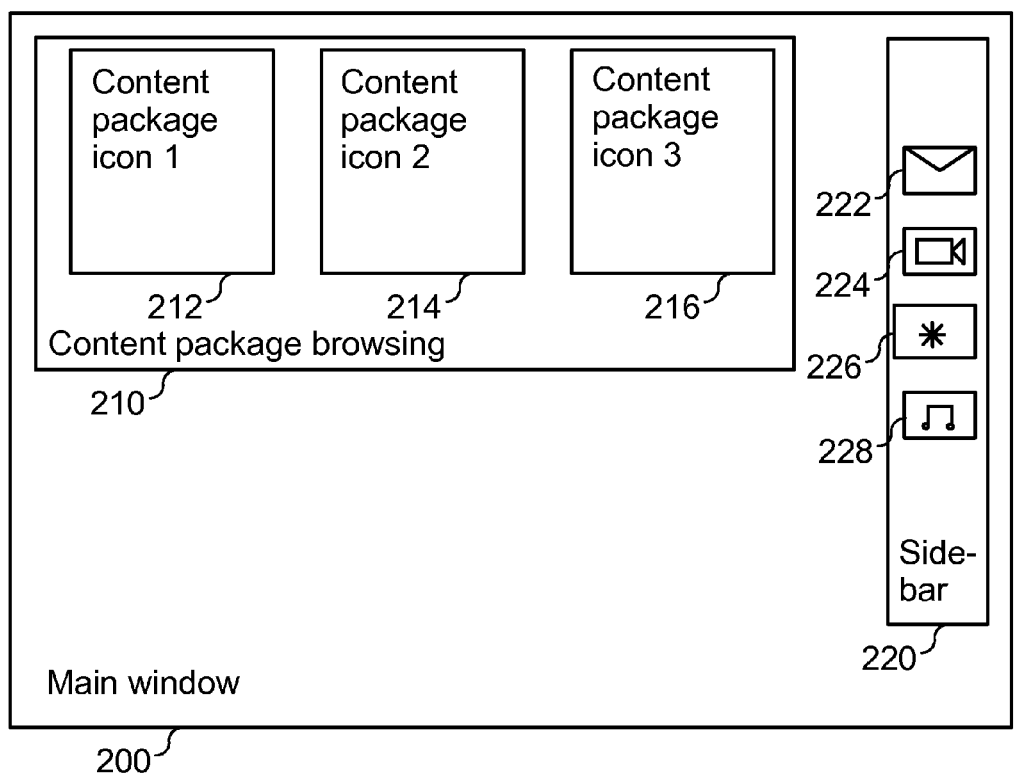
FIG. 2 illustrates a service selection screen from a television browser system in one embodiment of the invention.

FIG. 2 illustrates a service selection screen from a television browser system in one embodiment of the invention. In FIG. 2 there is shown a main window 200, which comprises a sidebar 220 from which different functions of the browser node 102 may be selected. In sidebar 220 there is shown an icon 222 for an E-mail client application, an icon 224 for playing video files stored in browser node 102, an icon 228 for playing music files stored in browser node 102 and an icon 226 for browsing content packages stored by browser 102. Content package icons may be presented in a specific content page browsing window 210. In content package browsing window 210 there are shown content package icons 212, 214 and 216. Each content package is introduced to the user via a specific icon file, which is rendered for presentation within the areas for content package icons 212, 214 and 216. If the icon file is a video it may be played within one of the areas for content package icons 212, 214 and 216. The user may select one of the content packages via a selection tool such as a mouse or any other pointer. After the selection of a content package, a main content file is opened to guide the rendering of other files in the content package on the user interface of browsing node 102 within window 200.

The embodiments of the invention described hereinbefore in association with FIGS. 1 and 2 may be used in any combination with each other. Several of the embodiments may be combined together to form a further embodiment of the invention.

Figure 3:
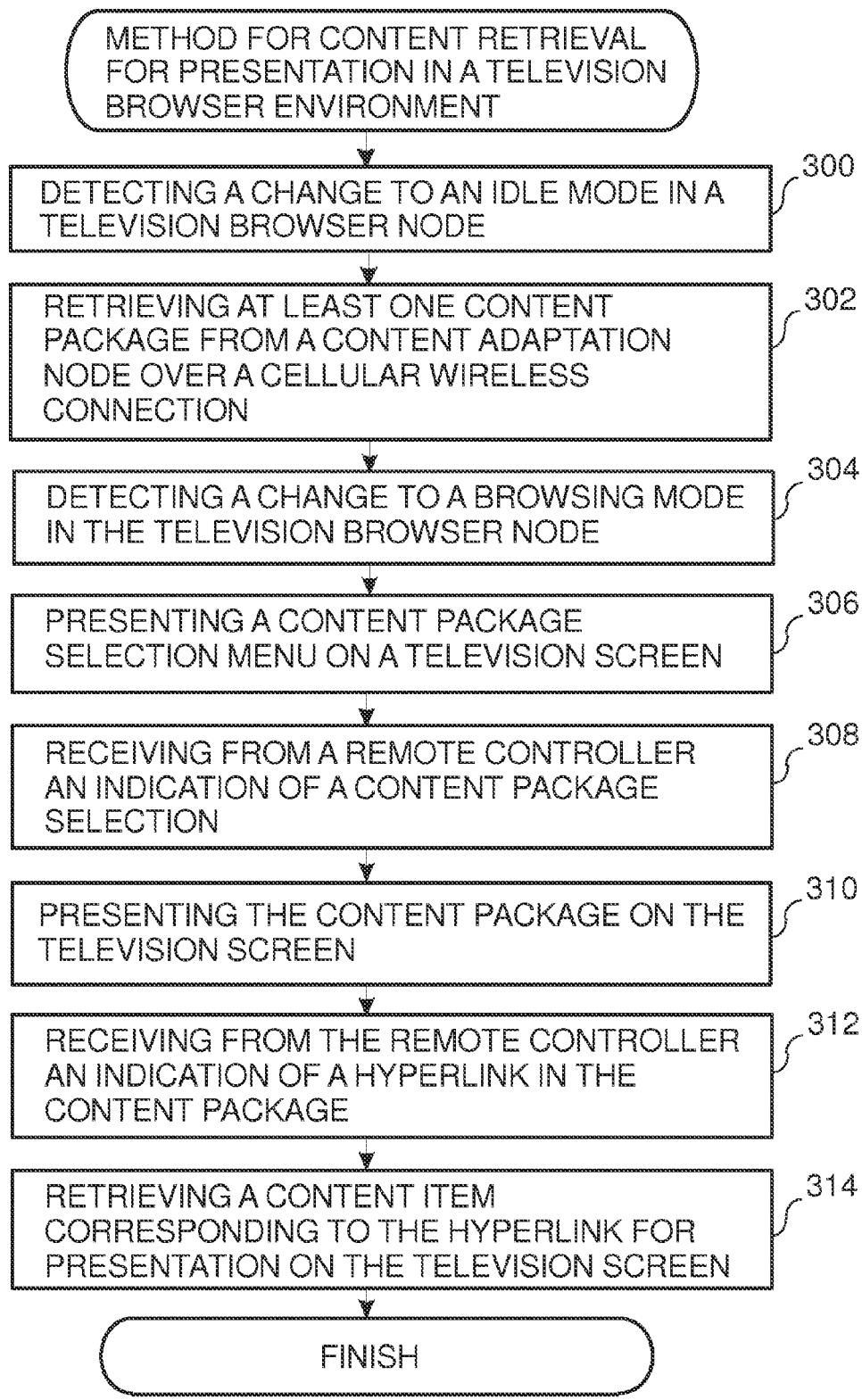
FIG. 3 is a flow chart illustrating a method for content retrieval for presentation in a television browser node in one embodiment of the invention.

FIG. 3 is a flow chart illustrating a method for content retrieval for presentation in a television browser node in one embodiment of the invention.

At step 300 a change to a background download enabled state is detected in a television browser node.

In one embodiment of the invention, the background download enabled state is detected in response to a selection of television program viewing mode via a remote control unit.

In one embodiment of the invention, there are additional conditions for detecting the background download enabled state, in addition to the selection of television program viewing mode. An additional connection may be that the television browser node remains in television program viewing mode for a predefined time. The predefined time may be, for example, one minute. An additional connection may be that the television browser node receives, for example, from a content adaptation node, an indication of a suitable time for background downloading of content packages. The suitable time may be determined by the content adaptation node based on network load observed the cellular network over which wireless cellular connections are established between the television browser node and the content adaptation node.

At step 302 at least one content package is retrieved from a content adaptation node over a cellular wireless connection.

In one embodiment of the invention, the television browser node may indicate to the content adaption node an identifier of the current user of the browser node. The identifier may be, for example, an E-mail address, a Uniform Resource Identifier (URI), a Uniform Resource Locator (URL), a SIP URI and a Tel-URI. The identifier may comprise a user name part and a domain name part.

In one embodiment of the invention, the content adaptation node is configured to fetch from the database of the content adaptation node the user profile corresponding to the identifier of the current user of the browser node and to provide content packages to television browser node where at least one content category attribute of the content package match at least one user profile attribute of the current user.

In one embodiment of the invention, the content category attributes of the content package match the user profile attributes of the current user.

At step 304 a change to a browsing mode is detected in the television browser node.

In one embodiment of the invention, the browser node may move to background download disabled state, where downloading of content packages from the content adaptation node is disabled until the browser node again moves to background download enabled state.

At step 306 the existence of at least one content package is indicated on the television screen to the user. A content package selection menu may be presented to the user. On the selection menu there is presented at least one icon file representing a content package.

At step 308 the browser node receives an indication via a remote control unit of a selection of a content package by the user.

At step 310 the browser node presents the content package on the television screen.

At step 312 the browser node receives an indication via the remote control unit of a selection of a hyperlink in the content package.

At step 314 the browser node retrieves a content item corresponding to the hyperlink over the cellular wireless connection for presentation on the television screen.

Thereupon, the method is finished. The numbering of the steps may indicate an order of execution for the method steps.

The embodiments of the invention described hereinbefore in association with FIGS. 1, 2 and 3 may be used in any combination with each other. Several of the embodiments may be combined together to form a further embodiment of the invention.

Figure 4:
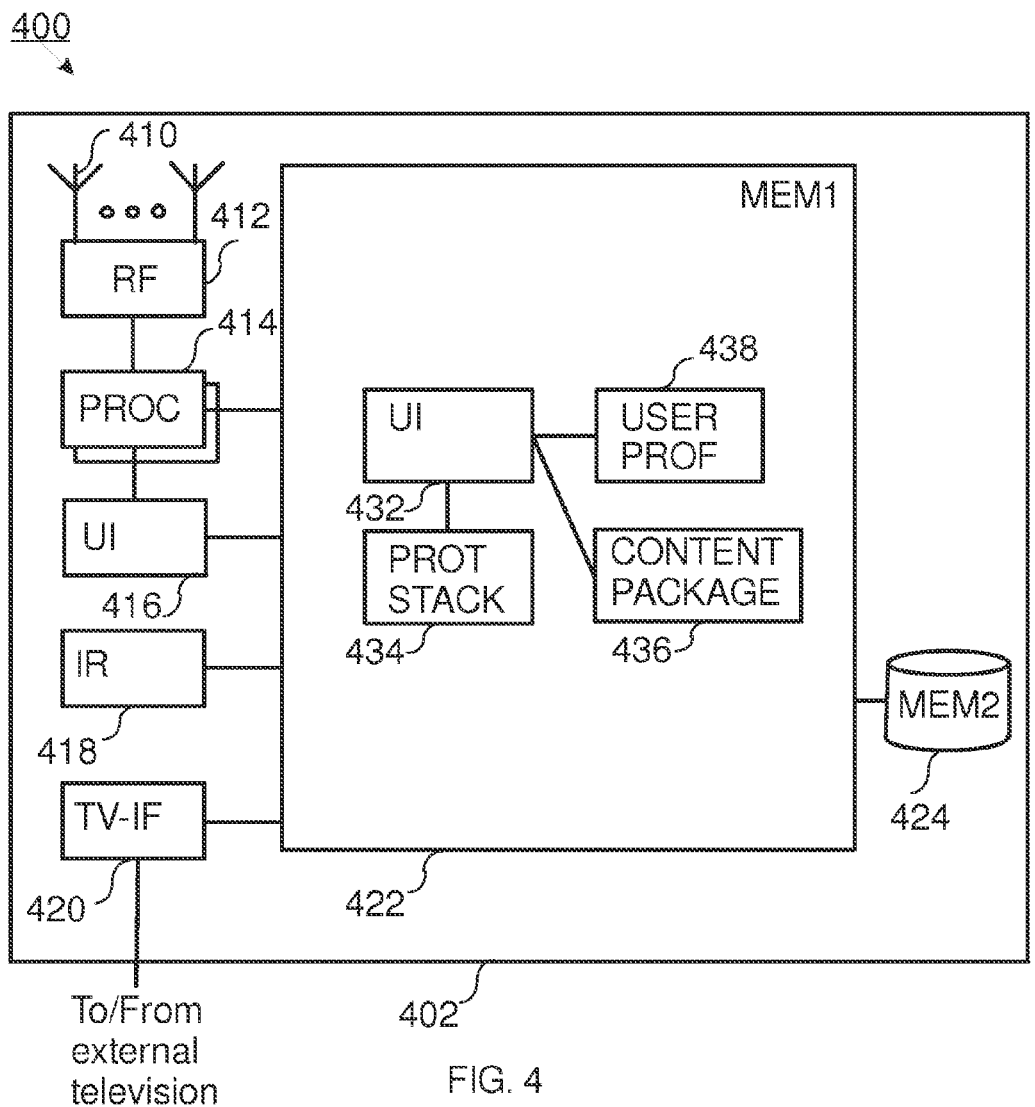
FIG. 4 is a block diagram illustrating an apparatus in one embodiment of the invention.

FIG. 4 is a block diagram illustrating an apparatus in one embodiment of the invention. In FIG. 4 there is an apparatus 400, which is, for example, a browser node, a mobile node, user equipment, a handset, a cellular phone, a mobile terminal, an Application Specific Integrated Circuit (ASIC), a chip or a chipset. Apparatus 400 may correspond to a browser node illustrated in FIG. 1. The internal functions of apparatus 400 are illustrated with a box 402. Apparatus 400 may comprise at least one antenna 410. There may be multiple input and output antennas. In association with mobile node there is Radio Frequency (RF) circuit 412. RF circuit 412 may be also any circuit or may be referred to as circuit 412. RF circuit 412 is communicatively connected to at least one processor 414. Connected to processor 414 there may be a first memory 422, which is, for example, a Random Access Memory (RAM). There may also be a second memory 424, which may be a non-volatile memory, for example, an optical or magnetic disk. There may also be a maintenance User Interface (UI) 416 and an IR transmitter/receiver 418. There may also be an Interface 420 to an external television (not shown). In memory 422 there may be stored software relating to functional entities 432 and 434. A user interface entity 432 displays one or more content packages such as content package 436 on a television screen connected to browser node 400 via interface 420. User interface entity 432 also transmits a user identity associated with a currently active user profile 438 to an external content adaptation server or node (not shown). User interface entity 432 communicates with an external remote control unit (not shown) via IR transmitter/receiver 418. Via IR transmitter/receiver 418 are received controls to switch user interface entity 432 between a television viewing mode and a content browsing mode. User interface entity communicates with a base station using a protocol stack 434. Protocol stack entity 434 comprises control plane protocol functions related to the interface towards a base station such as, for example, a UMTS Node B. Protocol stack entity 434 also comprises protocol functionalities related to user plane data communication with the content adaption server. Protocol stack entity 434 may be, for example, an internet protocol stack.

When the at least one processor 414 executes functional entities associated with the invention, memory 422 comprises entities such as, any of the functional entities 432 and 434. The functional entities within apparatus 400 illustrated in FIG. 4 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optical disk. Some functional entities may be implemented as program modules linked to another functional entity. The functional entities in FIG. 4 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3G communications networks, 4G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by inter-connecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Nonvolatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with the figures presented may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:
1. A method, comprising:
detecting a change to a background download enabled state at a mobile node, in response to a selection of a television program viewing mode via a remote control unit;
retrieving at least one content package from a remote node, in response to detecting the change to the background download enabled state, the at least one content package comprising at least one presentation file and at least one media file referred to in the presentation file;
detecting a change to a browsing mode in the mobile node;
transitioning to a background download disabled state, in response to the detecting of the change to the browsing mode, wherein downloading of content packages is disabled in the background download disabled state;
indicating an existence of at least one content package on a display, in response to detecting the change to the browsing mode;
receiving an indication via the remote control unit of a selection of a content package;
presenting content from at least one file in the selected content package on the display;

receiving at the mobile node an indication via the remote control unit of a selection of a hyperlink in the selected content package; and downloading a content item corresponding to the hyperlink at the mobile node.

2. The method according to claim 1, the method further comprising:

receiving from the remote control unit an indication of a change to a television screen closed mode; and transitioning the mobile node to the background download enabled state.

3. The method according to claim 1, the method further comprising:

detecting elapsing of a predefined time from receiving the selection of the television program viewing mode.

4. The method according to claim 1, the method further comprising:

receiving from a network providing a cellular wireless connection an indication of a suitable time for performing downloading.

5. The method according to claim 1, the method further comprising:

receiving from the remote control unit a selection of a user profile; and transmitting from the mobile node to the remote node an identifier of the current user of the mobile node based on the selection of the user profile.

6. The method according to claim 1, the method further comprising:

receiving at least one user profile attribute at the mobile node;

associating the at least one user profile attribute with a user identifier; and transmitting the at least one user profile attribute and the user identifier to the remote node.

7. The method according to claim 6, the method further comprising:

determining a location of the mobile node based on information provided from a network providing a wireless cellular connection; and setting the location of the mobile node as the at least one user profile attribute.

8. The method according to claim 1, the method further comprising:

opening a label file from the content package stored in the mobile node; and presenting a content package selection menu, the content package selection menu comprising a label for the content package, and the label is used to present the content from the label file.

9. The method according claim 1, wherein at least one content category attribute in each content package received during the background download enabled state is matched with at least one user profile attribute of the mobile node.

10. The method according to claim 1, wherein the mobile node comprises at least one of a Long-Term Evolution (LTE) User Equipment or a Universal Mobile Telecommunications System (UMTS) User Equipment.

11. The method according to claim 1, wherein the display is comprised in an external television.

12. The method according to claim 1, wherein the at least one content package is retrieved from the remote node over a cellular wireless connection.

13. An apparatus, comprising:
at least one processor to:

detect a change to a background download enabled state at the apparatus~in response to a selection of a television program viewing mode via a remote control unit, retrieve at least one content package from a remote node, in response to detecting the change to the background download enabled state, the at least one content package comprising at least one presentation file and at least one media file referred to in the presentation file, detect a change to a browsing mode in the apparatus, transition to a background download disabled state, in response to the detecting of the change to the browsing mode, wherein downloading of content packages is disabled in the background download disabled state, indicate an existence of at least one content package on a display in response to detecting the change to the browsing mode, receive an indication via the remote control unit of a selection of a content package, present content from at least one file in the selected content package on the display, receive at the apparatus an indication via the remote control unit of a selection of a hyperlink in the selected content package and download a content item corresponding to the hyperlink at the apparatus.

14. A non-transitory computer readable medium storing a computer program comprising code to cause the following when executed on a data processing system:

detecting a change to a background download enabled state at a mobile node, in response to a selection of a television program viewing mode via a remote control unit:

retrieving at least one content package from a remote node, in response to detecting the change to the background download enabled state, the at least one content package comprising at least one presentation file and at least one media file referred to in the presentation file;

detecting a change to a browsing mode in the mobile node; transitioning to a background download disabled state, in response to the detecting of the change to the browsing mode, wherein downloading of content packages is disabled in the background download disabled state;

indicating an existence of at least one content package on a display in response to detecting the change to the browsing mode;

receiving an indication via the remote control unit of a selection of a content package;

presenting content from at least one file in the selected content package on the display;

receiving at the mobile node an indication via the remote control unit of a selection of a hyperlink in the selected content package; and downloading a content item corresponding to the hyperlink at the mobile node.

15. The non-transitory computer readable medium according to claim 14, wherein said non-transitory computer readable medium comprises at least one of a removable memory card, a removable memory module, a magnetic disk, an optical disk, a holographic memory, and a magnetic tape.

* * * * *